(12) United States Patent
Nishino (10) Patent No.: US 7,179,409 B2
(45) Date of Patent: Feb. 20, 2007

(54) DIE CLAMPING APPARATUS AND DIE CLAMPING METHOD (75) Inventor: Satoharu Nishino, Aichi-ken (JP)

(73) Assignee: Kabushiki Kaisha Meiki Seisakusho, Aichi-Ken (JP)

( * ) Notice: Subject to any disclaimer, the term of this patent is extended or adjusted under 35 U.S.C. 154(b) by 428 days.

(21) Appl. No.: 10/875,778

(22) Filed: Jun. 25, 2004

(65) Prior Publication Data
US 2005/0025856 A1 Feb. 3, 2005

(30) Foreign Application Priority Data
Aug. 1, 2003 (JP) ............................. 2003-284727

(51) Int. Cl.
B29C 45/80 (2006.01)

(52) U.S. Cl. .................. 264/40.5; 264/328.1; 425/150; 425/190; 425/595

(58) Field of Classification Search ................ 425/150, 425/190, 595, 451.9; 264/40.5, 328.1
See application file for complete search history.

(56) References Cited

U.S. PATENT DOCUMENTS 5,135,385 A * 8/1992 Fukuzawa et al. .......... 425/595
5,192,557 A * 3/1993 Hirata et al. ................ 425/595
5,338,171 A * 8/1994 Hayakawa et al. ......... 425/595
5,863,474 A * 1/1999 Ito et al. .................... 264/40.5
6,655,949 B2 * 12/2003 Chikazawa et al. ......... 425/190
6,821,104 B2 * 11/2004 Kubota et al. .............. 425/150
6,932,924 B2 * 8/2005 Nishizawa et al. ........ 264/40.5

FOREIGN PATENT DOCUMENTS

JP 08-276482 10/1996
JP 10-296739 11/1998
JP 2003-181894 7/2003

* cited by examiner

Primary Examiner—James P. Mackey
(74) Attorney, Agent, or Firm—Browdy and Neimark, PLLC (57) ABSTRACT In a die clamping apparatus wherein a movable platen is moved toward a stationary platen, and after a half nut is engaged with an engaging part of a tie bar, the tie bar is pulled by a die clamping cylinder for clamping, provision is made of a first engaging position adjusting mechanism for controlling a movement of the tie bar or the half nut to a half nut engaging position at the time of die thickness adjustment and a second engaging position adjusting mechanism which allows the tie bar or the half nut to move and which moves the tie bar or the half nut to the half nut engaging position at the time of molding.

9 Claims, 10 Drawing Sheets

DIE CLAMPING APPARATUS AND DIE CLAMPING METHOD

BACKGROUND OF THE INVENTION

1. Field of the Invention

The present invention relates to a die clamping apparatus of an injection molding machine, etc., and especially relates to a die clamping apparatus and a die clamping method wherein a movable platen is moved toward a stationary platen by a die opening/closing mechanism, and a half nut is engaged with an engaging part formed on a tie bar, so that the tie bar can be pulled by a die clamping cylinder to carry out die clamping.

2. Description of the Related Art

Conventionally, a die clamping apparatus wherein a movable platen is moved toward a stationary platen by a die opening/closing mechanism and a half nut is engaged with an engaging part formed on a tie bar, so that the tie bar is pulled by a die clamping cylinder to carry out die clamping is known, as described in Japanese Unexamined Patent Publication (Kokai) No. 10-296739, Japanese Unexamined Patent Publication (Kokai) No. 2003-181894, or Japanese Unexamined Patent Publication (Kokai) No. 8-276482. In these known die clamping apparatuses, the position of a tie bar or a half nut must be adjusted to engage the half nut with an engaging part of the tie bar, and, to this end, an adjusting mechanism is provided.

Kokai No. 10-296739 discloses, in FIG. 9, a prior art wherein a stopper is provided on a half nut, so that a movable platen and the half nut can be stopped at a position capable of engaging with a tie bar by the stopper. However, in the known apparatus disclosed in FIG. 9, because die thickness adjustment is carried out by changing a piston position of a die clamping cylinder, there is a problem that a die clamping cylinder having a long stroke is required. Also, Kokai No. 10-296739 discloses, in FIG. 10, a prior art wherein a piston position of a die clamping cylinder is adjusted by an adjusting screw and a fixed nut in accordance with a change of the die thickness, whereby a tie bar is stopped at a position capable of engaging with a half nut. However, in the art disclosed in FIG. 10, because it is necessary to manually adjust the stopping position of each tie bar, separately, it is difficult to correctly move the tie bar to the stopping position and it takes time to complete the operation. Also, in the apparatus of FIG. 10, the structure of the die clamping cylinder becomes complicated and a strong die opening operation after completion of cooling a molded product cannot be carried out by the die clamping cylinder.

Kokai No. 10-296739 also discloses in FIG. 1, etc., that a tie bar is moved by a tie bar sliding servo motor, which is provided separately from a die clamping cylinder for pulling the tie bar, and that the moving speed of a movable platen and the tie bar are synchronized to engage a threaded part of the tie bar and a half nut. However, in Kokai No. 10-296739, since the tie bar and the piston, which are heavy, must be moved at high speed upon molding, four large-capacity servo motors are required, in order to avoid overload to the servo motor for sliding the tie bar, thus leading to a great increase in the cost.

Kokai No. 2003-181984 discloses, in FIG. 1, a connecting position adjusting means which is provided separately from a die clamping cylinder for pulling a tie bar, wherein a servo motor of the connecting position adjusting means is used for adjusting and moving the position of a tie bar with respect to a movable platen. However, in the arrangement of Kokai No. 2003-181894, since the position of the tie bar is adjusted by the servo motor at the time of molding, a large-capacity servo motor is required, as in Kokai No. 10-296739.

Further, Kokai No. 8-276482 discloses an apparatus wherein a sub-cylinder, whose piston rod is connected to a ram of a die clamping cylinder for pulling a tie bar, is provided and a position of the tie bar is adjusted by the sub-cylinder so as to stop the tie bar at a position capable of engaging with a half nut. However, in the apparatus of Kokai No. 8-276482, as the stroke of the hydraulic cylinder must be finely adjusted, it takes time to complete the position adjustment of the tie bar.

SUMMARY OF THE INVENTION

An object of the present invention is to provide a die clamping apparatus in which a movable platen is moved toward a stationary platen by a die opening/closing mechanism and, after a half-nut is engaged with an engaging portion formed on a tie bar, the tie bar is pulled by a die clamping cylinder to carry out die clamping, wherein a large-capacity servo motor is not employed in an engaging position adjusting mechanism for adjusting the position of the tie bar or the half nut, and nevertheless, the accuracy of the position adjustment of the tie bar or the half nut is increased upon adjusting the die thickness, and the position adjustment of the tie bar or the half nut can be carried out with high accuracy and at high speed, upon molding.

A die clamping apparatus of the present invention comprises a die opening/closing mechanism for moving a movable platen having a movable die away from or close to a stationary platen having a stationary die, a die clamping cylinder for clamping the stationary die and the movable die, a tie bar having an engaging part formed on the periphery thereof and pulled by the die clamping cylinder, and a half nut capable of engaging with/disengaging from the engaging part, wherein a first engaging position adjusting mechanism for controlling the movement of the tie bar or the half nut to a half nut engaging position, at the time of die thickness adjustment, and a second engaging position adjusting mechanism for allowing the tie bar or the half nut to move in a die clamping direction and a die opening direction and for moving the tie bar or the half nut to a half nut engaging position at the time of molding.

At the time of die thickness adjustment, the tie bar or the half nut is moved by the first engaging position adjusting mechanism to a changed half nut engaging position, so as to adjust an engaging position of the tie bar and the half nut. At the time of molding, the first engaging position adjusting mechanism is not operated and the second engaging position adjusting mechanism allows the movement of the tie bar by die clamping or strong die opening and moves the tie bar or the half nut to the half nut engaging position.

DETAILED DESCRIPTION OF THE INVENTION

Figure 1:
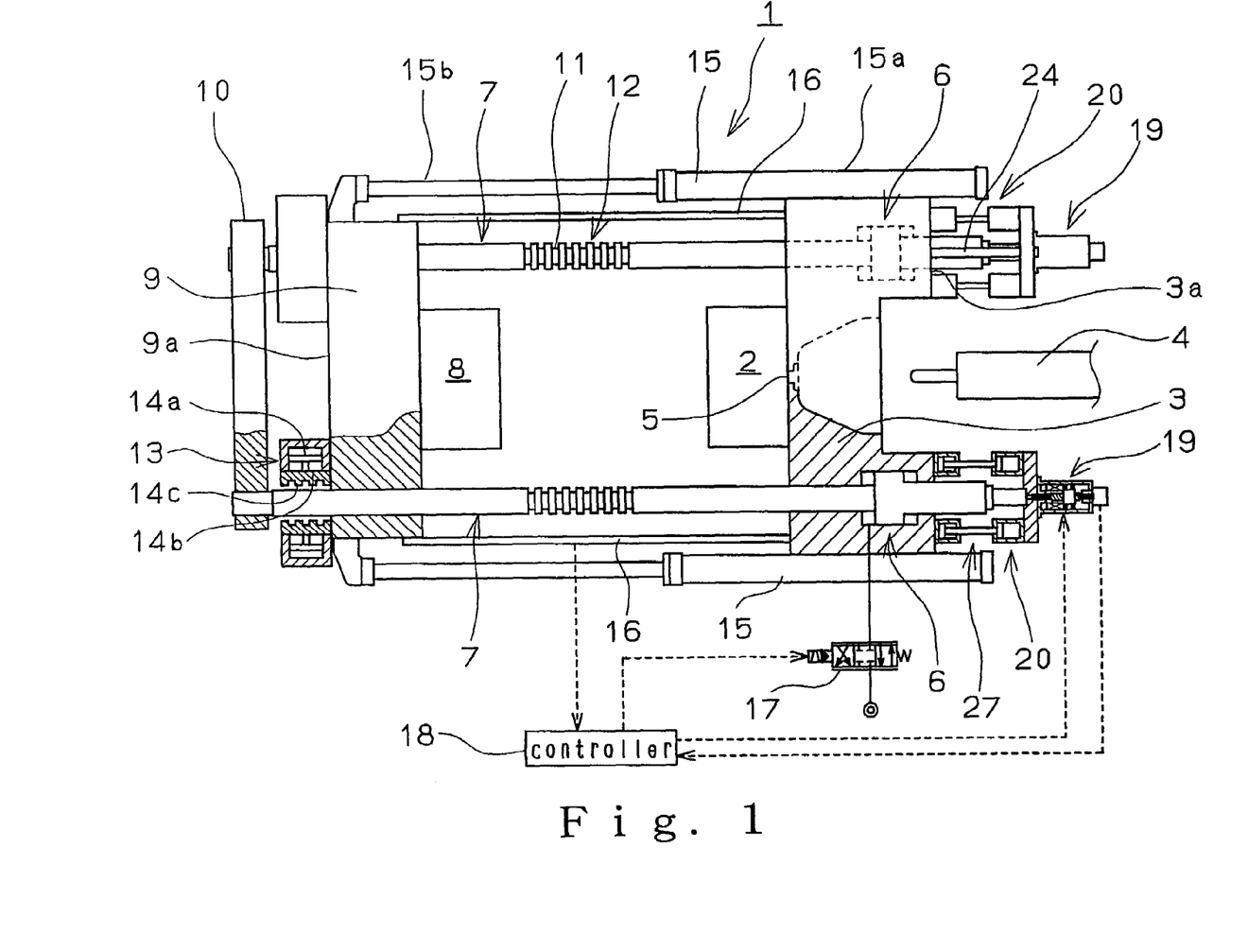
FIG. 1 is a plan view showing a die clamping apparatus of the present invention.

In FIG. 1, a die clamping apparatus 1 is a die clamping apparatus for an injection molding machine for injection-molding a product from a raw material such as a resin, metal, ceramic, etc. The die clamping apparatus 1 comprises a bed (not shown) to which a stationary platen 3 having a stationary die 2 is secured. The stationary platen 3 is provided, at the central part thereof, with a hole 5 for injecting a molten resin from an injecting device 4 to fill the stationary die 2. A die clamping cylinder 6, which serves as a clamping mechanism, is provided in the vicinity of each of the four sides of the stationary platen 3. A servo valve 17 is provided in a hydraulic circuit for each die clamping cylinder 6. The die clamping cylinder 6 is a reciprocating cylinder having a pressurizing stroke, a strong die opening stroke and a predetermined margin stroke. Four tie bars 7, which are extensions of piston rods of the die clamping cylinders 6, are inserted near the four sides of a movable platen 9 having a movable die 8, respectively, one end of each tie bar 7 being inserted in a support plate 10. The tie bar 7 is provided, at a predetermined position of the periphery thereof, with an engaging part 12 having a plurality of engaging grooves 11 in a die opening/closing direction. The movable platen 9 is provided with half nuts 13, on opposite sides of the portions having the tie bars 7 inserted therein, located near the four sides of its wall surface 9a opposite to the stationary platen. As engaging teeth 14 of the half nuts 13 are moved forward/backward by cylinders 14a, the half nuts 13 can be engaged with or disengaged from the engaging parts 12 of the inserted tie bars 7.

The stationary platen 3 is provided on both side surfaces thereof with cylinder parts 15a of die opening/closing cylinders 15, which serve as die opening/closing mechanisms for moving the movable platen 9 having the movable die 8 close to/away from the stationary platen 3 having the stationary die 2. The die opening/closing cylinders 15 are attached to the movable platen 9 through their piston rods 15b. A servo motor mechanism can be used for the die opening/closing mechanism. Four linear scales, which serve as movable platen position detecting mechanisms, are attached in four positions near the corresponding die clamping cylinders 6, between the stationary platen 3 and the movable platen 9. In this embodiment, a detected value of the linear scale 16 is transmitted to a controller 18 which controls the servo valves 17 of the die clamping cylinders 6. Thus, each die clamping cylinder 6 is independently controlled and the movable platen 9 is controlled to be in parallel with the stationary platen 3. Although the details will be explained hereinafter, the position adjustment of the tie bar 7, at the time of die thickness adjustment, is carried out based on the detected value of the linear scale 16.

An engaging position adjusting mechanism of the die clamping apparatus 1 of the present embodiment will be explained. The engaging position adjusting mechanism moves the tie bar 7 so that the half nut 13 engages with the engaging part 12 formed on the tie bar 7. The engaging position adjusting mechanism is provided for each die clamping cylinder 6, and thus, the position adjustment of each tie bar 7 can be independently performed for each die clamping cylinder 6. In this embodiment, the engaging position adjusting mechanism is comprised of a first engaging position adjusting mechanism 19 which controls the tie bar 7 to move to a half nut engaging position (the position in FIG. 5) at the time of die thickness adjustment, and a second engaging position adjusting mechanism 20 which allows the movement of the tie bar 7 at the time of molding and moves the tie bar 7 to the half nut engaging position (the position in FIG. 5). A first end of the first engaging position adjusting mechanism 19 and a first end of the second engaging position adjusting mechanism 20 are connected directly or indirectly. A second end of one of the engaging position adjusting mechanisms is attached to the tie bar 7 or a piston 6a of the die clamping cylinder 6. A second end of the remaining adjusting mechanism is attached to any one of the members other than the tie bar 7 or the piston 6a, that is, the stationary platen 3, the movable platen 9, the support plate 10 or the bed.

Figure 2:
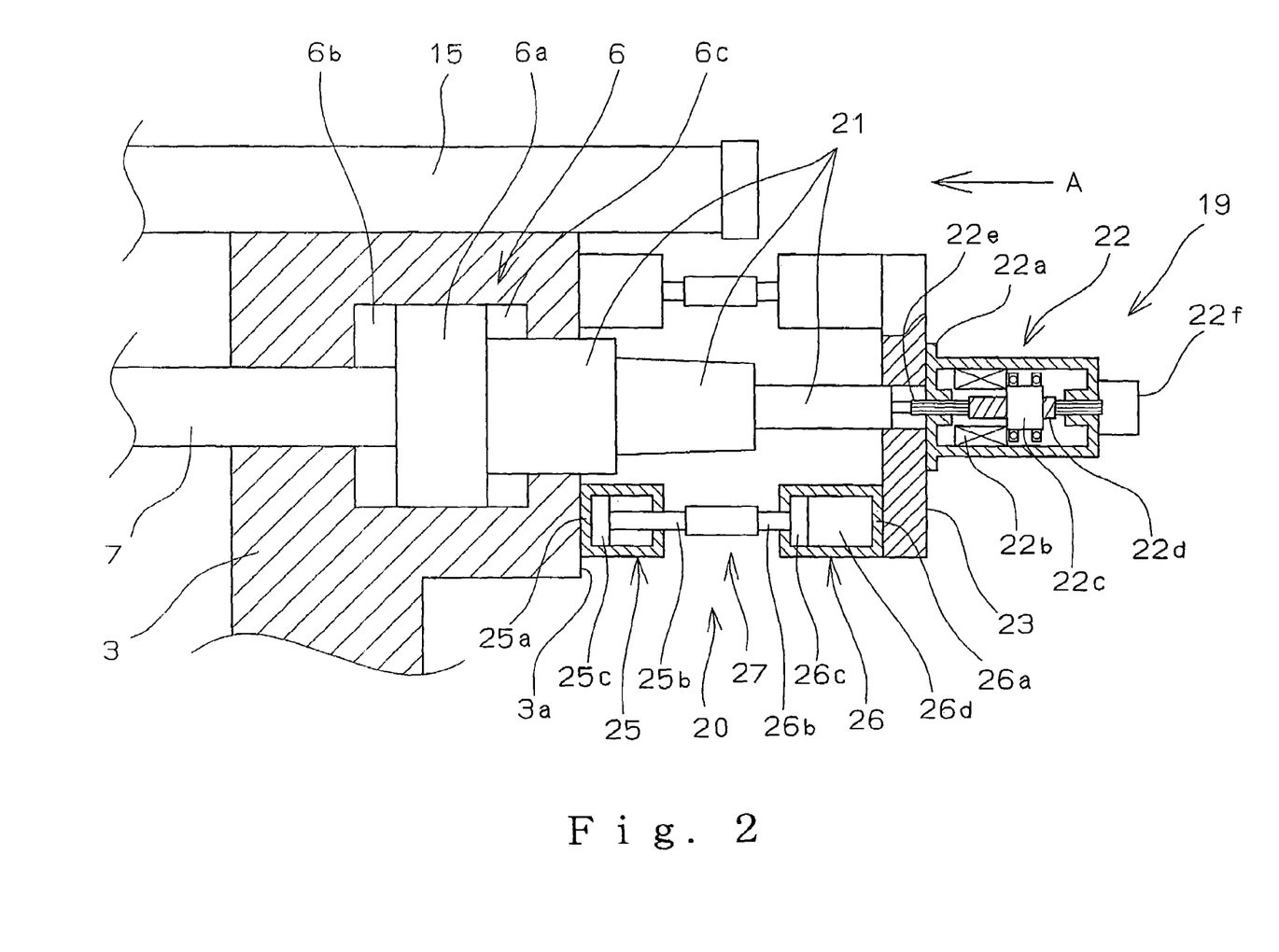
FIG. 2 is an enlarged plan view showing an engaging position adjusting mechanism of a die clamping apparatus of an embodiment of the present invention.

The first engaging position adjusting mechanism 19 will be explained referring to FIG. 2. A rod 21 is fixed to the piston 6a of the die clamping cylinder 6, on the side opposite to the side having the tie bar 7. The rod 21 projects by a predetermined length from an injecting device side wall 3a of the stationary platen 3, which is an outer shell of the die clamping cylinder 6. A driving rod 22e of a servo motor mechanism 22 is fixed to the rod 21.

The servo motor mechanism 22 attached to the first engaging position adjusting mechanism 19 is an electrically driven cylinder. A rotor 22b and a ball nut 22c connected to the rotor 22b at a predetermined reduction ratio are provided within an outer shell 22a. The driving rod 22e having a spline is connected to a ball screw 22d inserted in the ball nut 22c. Thus, in the servo motor mechanism 22, a rotary motion of the rotor 22b is converted to a linear motion of the driving rod 22e which cannot rotate. In the servo motor mechanism 22, the rotation of the rotor 22b is transmitted to the ball nut 22c at a comparatively large reduction ratio, and thus, large power can be obtained at a comparatively low speed by a small servo motor. A rotary encoder 22f capable of detecting a displacement of the driving rod 22e is attached to the other end of the servo motor mechanism 22. The outer shell 22a of the servo motor mechanism 22 is fixed to a center of a moving plate 23 whose planar surface is provided in parallel with the injecting device side wall 3a of the stationary platen 3. The servo motor mechanism 22 is connected to the controller 18 and a detected value of the rotary encoder 22f is transmitted to the controller 18. The detected value of the linear scale 16, which serves as a movable platen position detecting mechanism, is transmitted to the servo motor mechanism 22 as a command value through the controller 18.

Figure 3:
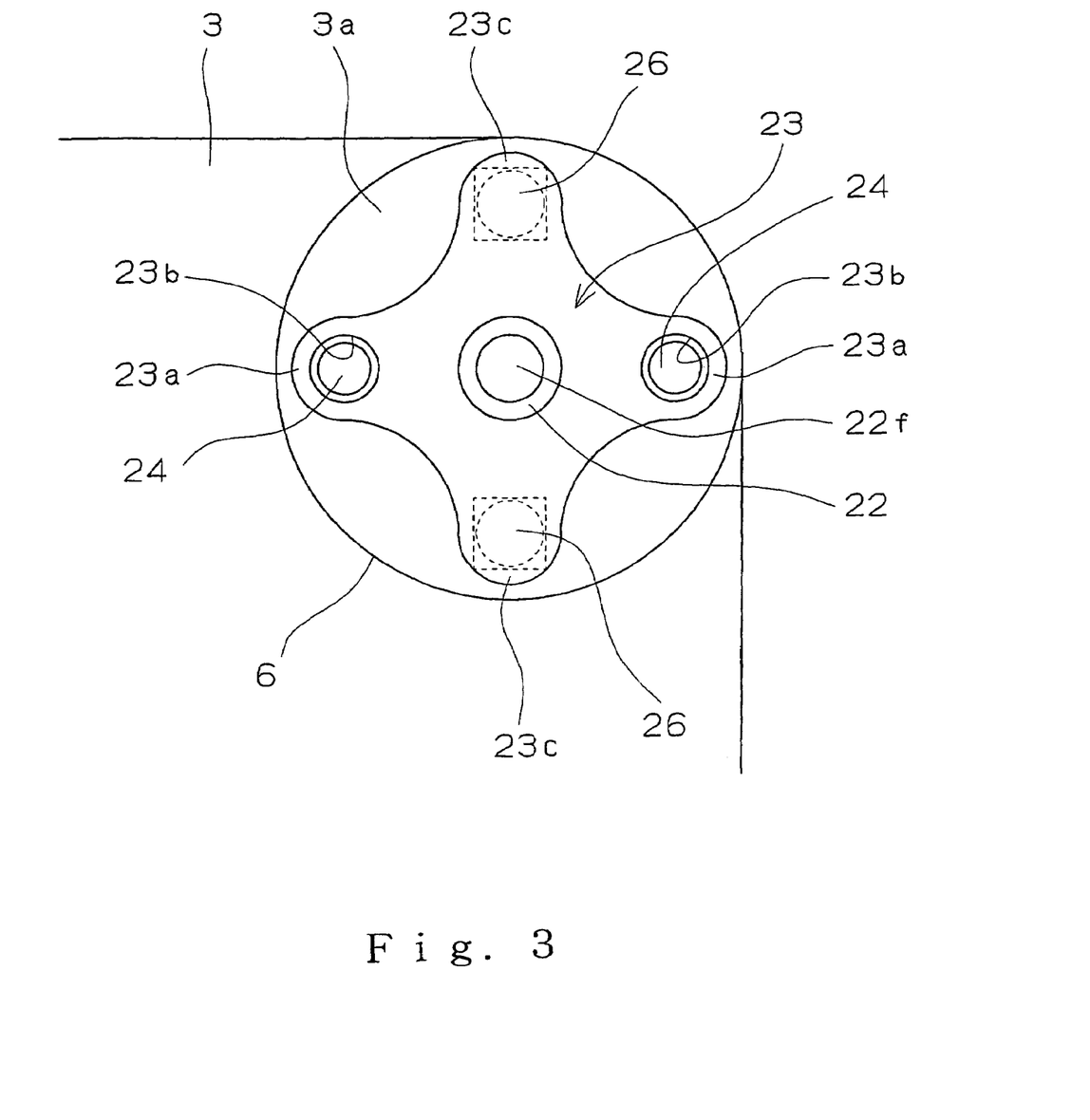
FIG. 3 is an enlarged view of an engaging position adjusting mechanism, viewed from the direction of an arrow A in FIG. 2.

The second engaging position adjusting mechanism 20 will be explained referring to FIGS. 2 and 3. The stationary platen 3 is provided, on the injecting device side wall 3a having the die clamping cylinder 6, with two guide rods 24 projecting in parallel with the rod 21 on both sides of the rod 21. The other ends of the guide rods 24 are slidably attached in holes 23b formed a pair of diametrically opposed end portions 23a of the moving plate 23. Two cylinder mechanisms 27, which permit or do not permit the moving plate 23 and tie bars 7 to move at the time of molding, are provided between the injecting device side wall 3a and another pair of diametrically opposed end portions 23c of the moving plate 23.

The second engaging position adjusting mechanism 20 is an abutting moving mechanism comprising a first cylinder 25 having a short piston stroke and a second cylinder 26 having a longer piston stroke than that of the first cylinder 25 provided in series in the same direction as the tie bar 7 and the rod 21. The first cylinder 25 is fixed at its cylinder end 25a to the injecting device side wall 3a of the stationary platen 3 having the die clamping cylinder 6, with a piston rod 25b thereof facing the moving plate 23. The second cylinder 26 is fixed at its cylinder end 26a to the moving plate 23, with a piston rod 26b facing the stationary platen 3. The piston rods 25b and 26b are connected by a joint. In the cylinder mechanism 27, the second cylinder 26 has a longer piston stroke than that of the first cylinder 25 because the first cylinder absorbs the movement of the tie bar 7 at the time of pressurizing, while the second cylinder 26 absorbs the movement of the tie bar 7 at the time of strong die opening.

The engaging position adjusting mechanism is not limited to those described above, and can be modified as follows. The first engaging position adjusting mechanism 19 is not limited to the servo motor mechanism 22, and can be any other motor as far as it is a moving mechanism for feedback control using an electric motor. Also, the driving rod 22e of the servo motor mechanism 22 and the rod 21 of the die clamping cylinder 6 can be connected through a link mechanism, to thereby make it possible to use a servo motor having a smaller driving force. With regard to the second engaging position adjusting mechanism 20, although one cylinder is used as an abutting moving mechanism for moving the tie bar 7, a sliding member other than a cylinder can be used to move the tie bar 7. The number of the cylinder mechanisms 27 provided to each die clamping cylinder 6 is not limited to two. Further, the engaging position adjusting mechanism can be constructed so that the second end of the cylinder mechanism 27 is connected to the rod 21 of the die clamping cylinder 6, the second end of the servo motor mechanism 22 is connected to the injecting device side wall 3a of the stationary platen 3, the first end of the cylinder mechanism 27 is connected to the moving plate 23, and the first end of the servo motor mechanism 22 is connected to the moving plate 23, whereby the cylinder mechanism 27 and the servo motor mechanism 22 are connected. Further, the first engaging position adjusting mechanism 19 and the second engaging position adjusting mechanism 20 can be provided separately, such that the first engaging position adjusting mechanism 19 is connected to the stationary platen 3 and the second engaging position adjusting mechanism 20 is connected to the support plate 10, to thereby adjust the engaging position by moving both of the tie bar 7 and the half nut 13.

Next, the operation of the engaging position adjusting mechanism in the die clamping apparatus 1, at the time of die thickness adjustment and at the time of molding will be explained using FIGS. 4 to 8.

(At the time of Die Thickness Adjustment)

Figure 4:
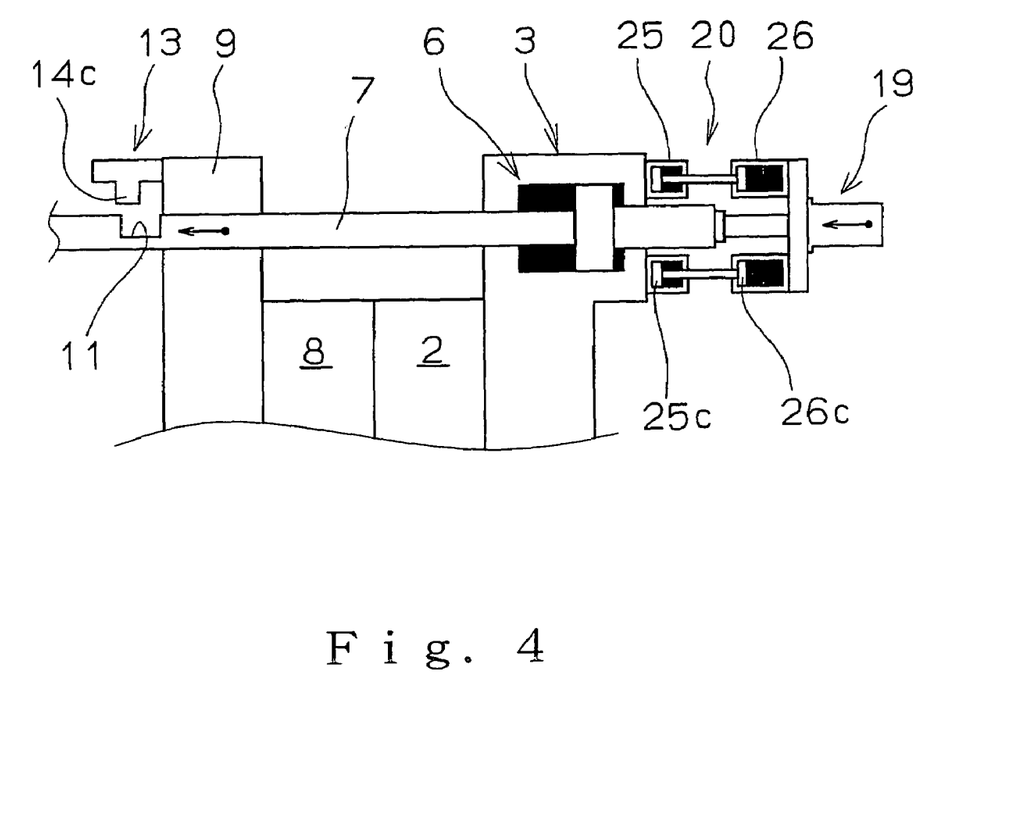
FIGS. 4 to 8 are explanatory views showing an operation of an engaging position adjusting mechanism of a die clamping apparatus in different positions.

As shown in FIG. 4, when a die used for molding is changed to a die having a different thickness, the space between the stationary platen 3 and the movable platen 9, at the time of closing dies, is changed, and the half nut engaging position is changed. Thus, at first the die thickness is adjusted. At the time of die thickness adjustment, the piston 25c of the first cylinder 25 of the second engaging position adjusting mechanism 20 is held in the rearmost position and the piston 26c of the second cylinder 26 is held in the frontmost position, by supplying working oil from a hydraulic mechanism (not shown), and the position of the moving plate 23 is fixed with respect to the stationary platen 3. The stationary die 2 and the movable die 8 are located between the stationary platen 3 and the movable platen 9, and the movable platen 9 is moved by the die opening/closing cylinder 15. The position of the half nut, when the dies abut, at the time of die closing, is detected by the linear scale 16 which serves as the movable platen position detecting mechanism, and the detected value is transmitted to the controller 18. In the controller 18, the most suitable engaging groove 11 is calculated and determined based on the transmitted detected value. The most suitable engaging groove 11 corresponds to a position in which the piston 6a of the die clamping cylinder 6 has a clamping stroke and a strong die opening stroke when the tie bar 7 is engaged with the half nut 13.

When the engaging groove 11 with which the half nut 13 is to be engaged is determined, the controller 18 sends a command to the servo motor mechanism 22 of the first engaging position adjusting mechanism 19, and the driving rod 22e and the tie bar 7 are moved to their target positions based on the detected value of the rotary encoder 22f which serves as a tie bar position detecting mechanism. At that time, a rod side oil chamber 6b and a cylinder side oil chamber 6c of the die clamping cylinder 6 are connected to a drain and little hydraulic pressure is given. After the movement of the tie bar 7 is completed, the servo motor of the servo motor mechanism 22 is servo-locked so that the tie bar 7 is not moved with respect to the moving plate 23. Because the movement of the tie bar 7 by the first engaging position adjusting mechanism 19 is used only for adjusting die thickness, the moving speed of the tie bar 7 can be slow and a comparatively small servo motor, etc., can be used.

(At the Time of Molding: Half Nut Engaging Step)

Figure 5:
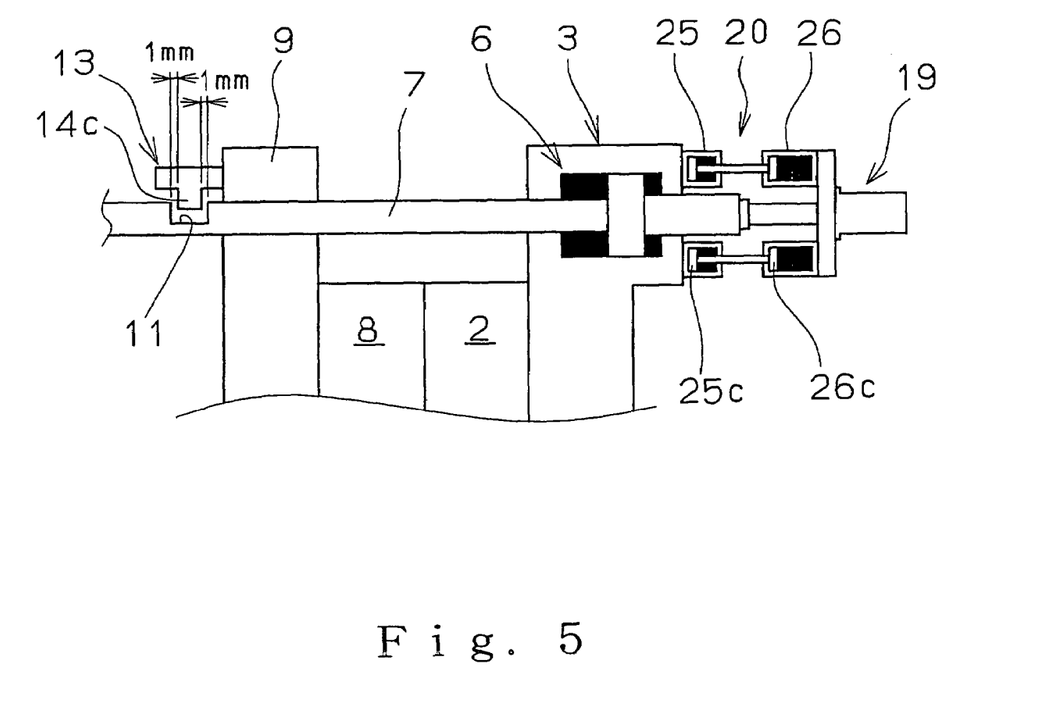

As shown in FIG. 5, when the movable die 8 and the stationary die 9 abut, the cylinder 14a is operated and the half nut 13 is engaged with the engaging groove 11 of the tie bar 7. By that time, the tie bar 7 has been moved to the half nut engaging position capable for engaging the engaging groove 11 and the half nut 13, by the die thickness adjustment, and is on standby. In the present embodiment, when the half nut 13 is engaged, there are spaces of 1 mm between respective walls of the crest 14c of the engaging tooth 14b of the half nut 13 and respective walls of the engaging groove 11 of the engaging part 12. At this time, in the second engaging position adjusting mechanism 20, the piston 25c of the first cylinder 25 is held in the rearmost position, the piston 26c of the second cylinder 26 is held in the frontmost position, and the servo motor mechanism 22 is servo-locked.

(At the Time of Molding: Pressurizing Step)

Figure 6:
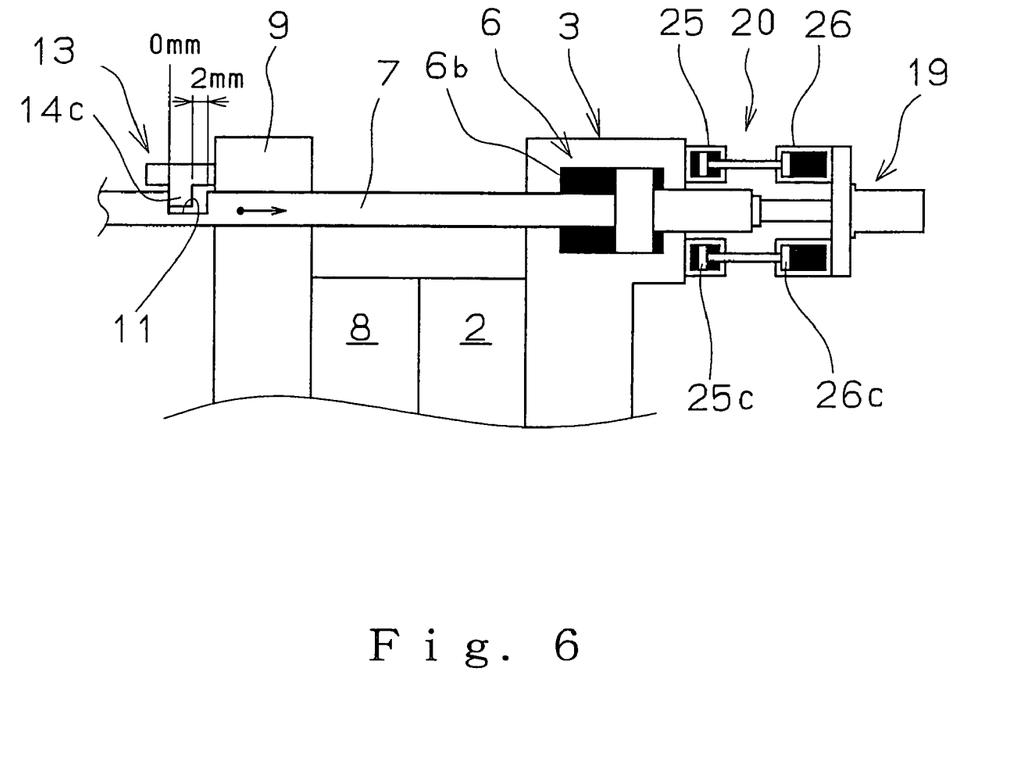

As shown in FIG. 6, when the crest 14c of the engaging tooth 14b of the half nut 13 is engaged with the engaging groove 11, the working oil is supplied to the rod side oil chamber 6b of the die clamping cylinder 6 through the servo valve 17. Thus, the tie bar 7 is pulled in the die closing direction to clamp the movable die 8 and the stationary die 2 with pressure. Then, the space (1 mm) between the die opening side wall (left side wall in the drawing) of the crest 14c of the half nut 13 and the die opening side wall (left side wall in the drawing) of the engaging groove 11 of the tie bar 7 disappears and the walls abut against each other. At the start of the pressurizing step, the piston 25c of the first cylinder 25 is free and the piston 26c of the second cylinder 26 is fixed to the frontmost extremity. The servomotor mechanism 22 is servo-locked. The displacement of the tie bar 7 is transmitted through the rod 21 secured to the piston 6a of the die clamping cylinder 6, the servo-locked first engaging position adjusting mechanism 19 and the moving plate 23 to the second engaging position adjusting mechanism 20, and is absorbed by the second engaging position adjusting mechanism 20. Thus, the displacement of 1 mm of the tie bar 7 and the rod 21 in the die closing direction causes the displacement of 1 mm of the piston 25c of the first cylinder 25 in the die closing direction (from left to right in FIG. 2), and the piston rod 25b is slightly projected. Further, the piston 25c of the first cylinder 25 is moved by the same amount as the movement of the tie bar 7 at the time of pressurizing. In the pressurizing step, a molten resin is injected from a nozzle of the injecting device 4 inserted through the hole 5 to fill the cavity, and then the molded product is cooled.

(At the Time of Molding: Pressure Releasing Step, at the Start of Strong Die Opening Step)

Figure 7:
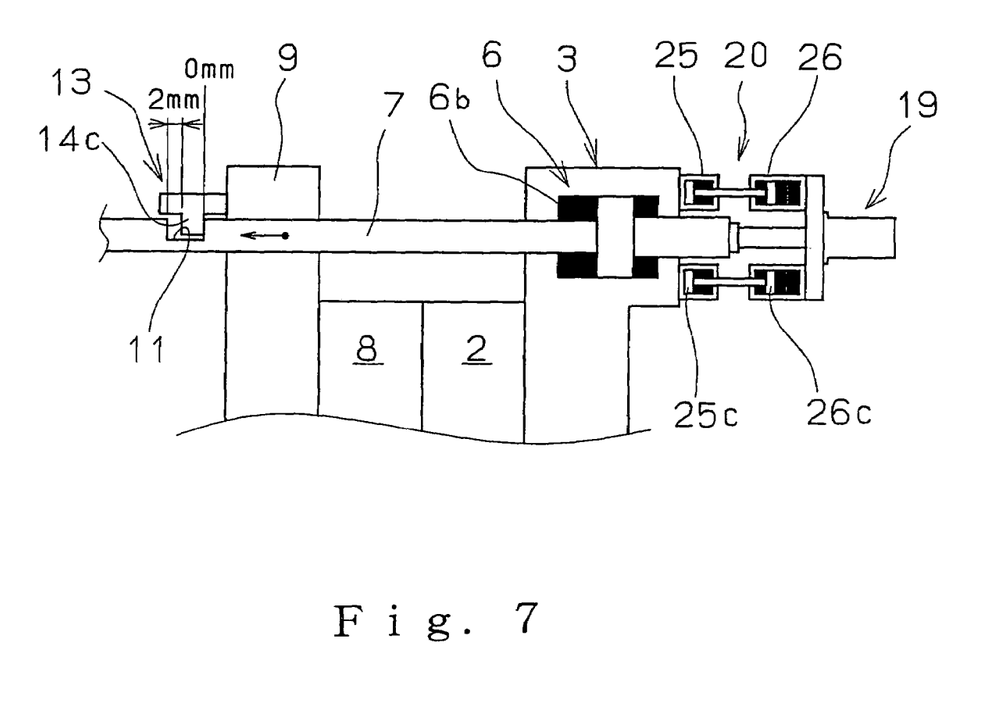

When the cooling of the molded product is completed, the oil in the rod side oil chamber 6b of the die clamping cylinder 6 is drained and the pressure is released. At the completion of the pressure release, the strong die opening step is started. As shown in FIG. 7, at the start of the strong die opening step, the tie bar 7, which is the piston rod of the die clamping cylinder 6, is moved toward the die opening side, and the die closing side wall (right side wall in the drawing) of the crest 14c of the half nut 13 and the die closing side wall (right side wall in the drawing) of the engaging groove 11 abut. The space of 2 mm is formed between the die opening side wall (left side wall in the drawing) of the crest 14c and the die opening side wall (left side wall in the drawing) of the engaging groove 11. Thus, the tie bar 7 and the moving plate 23 are moved at least 2 mm toward the die opening side. At this time, both the first cylinder 25 and the second cylinder 26 are free and the servo motor mechanism 22 is servo-locked. The displacement, 1 mm or more, of the piston 25c of the first cylinder 25 in the die closing side caused in the pressurizing step, corresponding to the movement of the tie bar, disappears as the tie bar 7 is moved and the piston 25c is moved to the rearmost extremity. The piston 26c of the second cylinder 26 is moved by 1 mm backwardly toward the die closing side. Then, a displacement of 2 mm of the tie bar 7 is absorbed by the cylinders 25 and 26.

(At the Time of Molding: Completion of Strong Die Opening Step)

Figure 8:
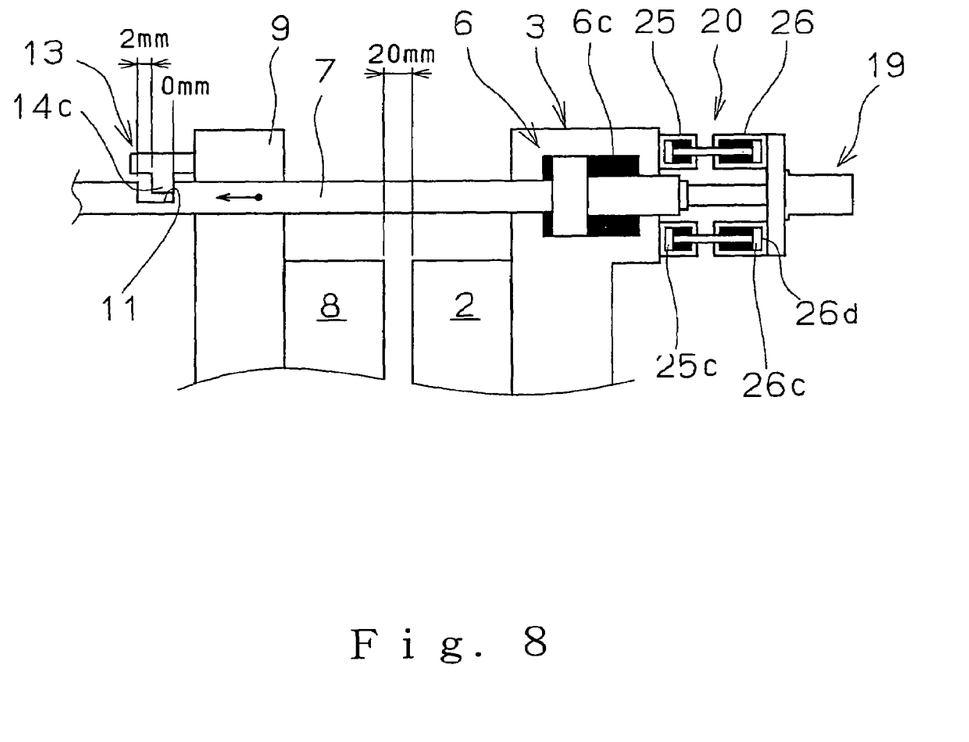

In the strong die opening step using the die clamping cylinder 6, in order to release the molded product from the cavity surface, the die opening is carried out by controlling the die clamping cylinders 6 in parallel with each other using the servo valves 17. Because the strong die opening by the die clamping cylinder 6 has a stronger die opening force than the die opening by the die opening/closing mechanism, it is advantageous for molding a deep product for which the die opening is difficult. In the strong die opening step, oil is supplied to the cylinder side oil chamber 6c of the die clamping cylinder 6 to move the tie bar 7 in the die opening direction and release the movable die 8 from the stationary die 2. In the present embodiment, the distance of the strong die opening is set to be 20 mm. At this time, the piston 25c of the first cylinder 25 is fixed to the rearmost position, the second cylinder 26 is free and the servo motor mechanism 22 is servo-locked. As shown in FIG. 8, when the tie bar 7 is moved by a displacement corresponding to the strong die opening distance of 20 mm, by the die clamping cylinder 6, the piston 26c is relatively moved toward the die closing side within the second cylinder 26 to absorb the movement of 20 mm. The piston 26c is moved at least 21 mm, including the movement in the pressure releasing step, counted from the frontmost extremity of the piston 26c, within the second cylinder 26, and the rod 21 is retracted.

(At the Time of Molding: Half Nut Releasing Step)

At the completion of the strong die opening, the cylinder 14a is driven and the half nut 13 is released from the engaging groove 11. In the half nut releasing step, the half nut 13 can be released from the engaging groove 22 after the tie bar 7 is slightly moved toward the die closing side by the cylinder mechanism 27 or the servo motor mechanism 22.

(At the Time of Molding: Die Opening Step)

After the completion of releasing the half nut 13, the movable platen 9 is moved to the die opening completion position by the die opening/closing cylinder 15 and the molded product is removed. In the meantime, oil is supplied to the cylinder side oil chamber 26d of the second cylinder 26, the piston 26c of the second cylinder 26 is moved by a predetermined distance toward the front most position, and the piston 26c is positioned in the front most position. In the meantime, the piston 25c of the first cylinder 25 is held in the rearmost position. Thus, the tie bar 7 fixed and coupled to the second cylinder 26 is returned to the initial half nut engaging position (position of FIG. 5) having a stroke necessary for the pressurizing and the strong die opening. Although the tie bar 7 has been moved by the operation of the die clamping cylinder 6 at the time of molding, the second engaging position adjusting mechanism 20 allows the movement of the tie bar 7 to return the tie bar 7 to the initial half nut engaging position at the time of the next engaging of the half nut 13. Because the second engaging position adjusting mechanism 20 adopts the above-mentioned simple abutting moving mechanism, the tie bar 7 can be certainly moved to the half nut engaging position without using the first engaging position adjusting mechanism 19 at the time of molding, and a sufficient speed can be practically obtained compared to the conventional apparatus using a large capacity servo motor.

In the present invention, other than the above-mentioned die clamping apparatus 1 wherein the tie bar 7 is moved to the half nut engaging position, a die clamping apparatus 31 wherein a half nut 41 is moved to a half nut engaging position can be used. In the die clamping apparatus 31 shown in an example of FIG. 9, a movable platen 35 having a movable die 34 is provided with respect to a stationary platen 33 having a stationary die 32, and a die opening/closing cylinder 36, which serves as a die opening/closing mechanism for moving the plates close to or away from each other is located between the stationary platen 33 and the movable platen 35. A movable platen position detecting mechanism (not shown) is provided between the stationary platen 33 and the movable platen 35. Tie bars 37 are fixed, near the four sides of the movable platen 35, projecting toward the stationary platen 33. The tie bar 37 is provided, at the periphery thereof, with an engaging part 39 having many engaging grooves 38.

Figure 9:
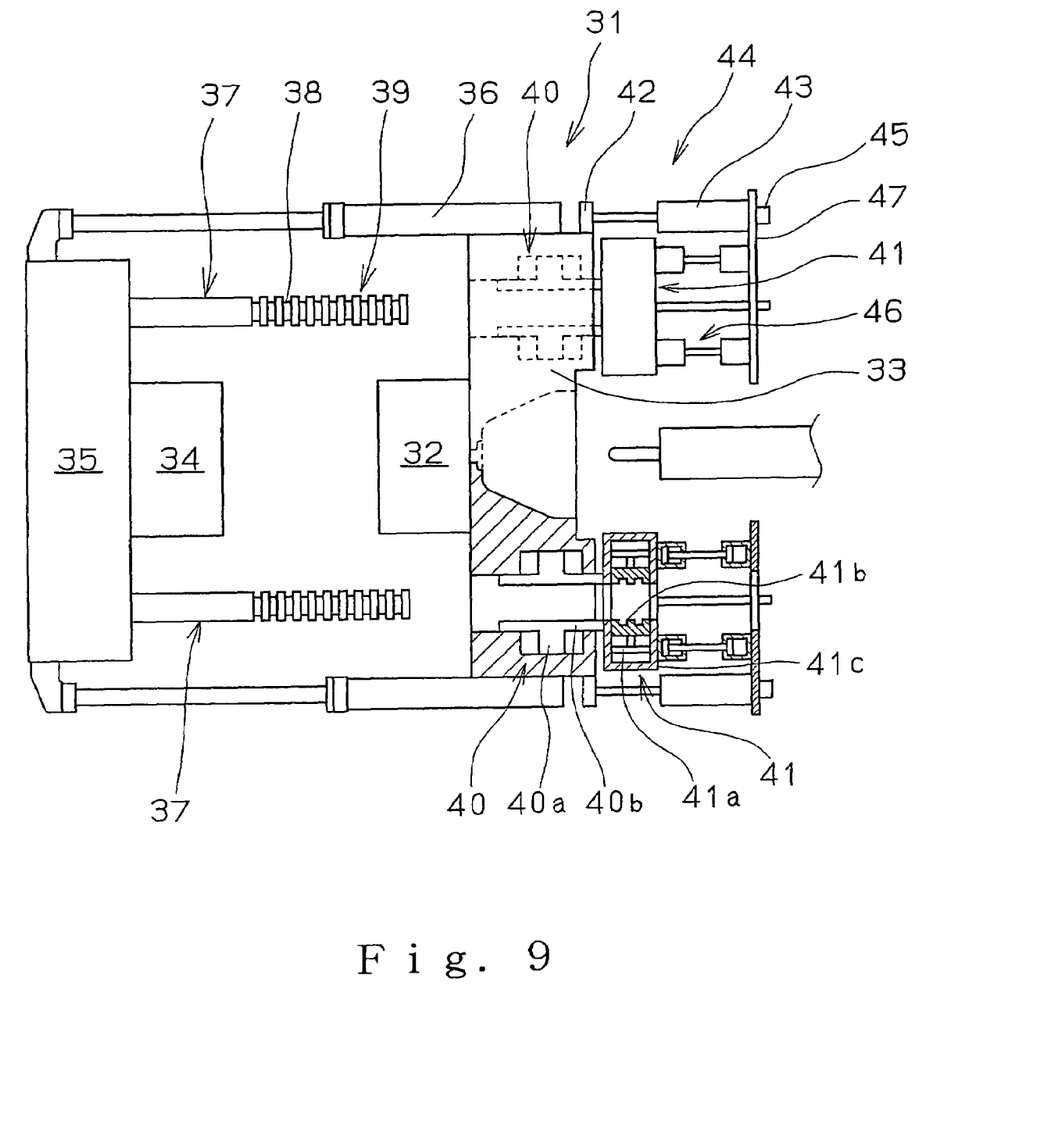
FIG. 9 is a plan view showing an example 1 of a die clamping apparatus.

The stationary platen 33 is provided, near the four sides thereof, with die clamping cylinders 40. A hollow piston 40a, in which the tie bar 37 can be inserted, is attached to the die clamping cylinder 40, and a hollow piston rod 40b is fixed to the piston 40a. A half nut 41 is fixed to an end of the piston rod 40b. Thus, the half nut 41 is moved in the die opening/closing directions by actuating the die clamping cylinder 40. The half nut 41 is per se known and the engaging teeth 41b can be moved forwardly/backwardly by a cylinder 41a with respect to the engaging part 39 of the tie bar 37. In the die clamping apparatus 31, by the above-mentioned constitution, the movable platen 35 is moved toward the stationary platen 33 by the die opening/closing cylinder 36, the tie bar 37 is inserted in the die clamping cylinder 40 and the half nut 41 is engaged with the engaging part 39, to thereby pull the tie bar 37 by the die clamping cylinder 40 for die clamping.

In the die clamping apparatus 31, similar to the die clamping apparatus 1, at the time of die thickness adjustment, the half nut 41 is adjusted so as to be engaged with the most suitable engaging groove 38 of the tie bar 37. However, because the tie bar 37 is fixed to the movable platen 35 in the die clamping apparatus 31, the adjustment of the half nut engaging position is carried out by controlling the movement of the half nut 41. Accordingly, at the time of die thickness adjustment, the half nut engaging position is adjusted by adjusting the positions of the piston 40a of the die clamping cylinder 40 and the half nut 41 with respect to the stationary platen 33. At the time of molding, the position of the half nut 41 can be changed by the pressurizing and strong die opening operations and the position of the half nut 41 is adjusted to be returned to the initial half nut engaging position.

The constitution and operation of the components of an engaging position adjusting mechanism of the die clamping apparatus 31 is similar to those of the die clamping apparatus 1. A bracket 42 is fixed to the stationary platen 33, and a first engaging position adjusting mechanism 44 comprising a servo motor mechanism 43 is attached to the bracket 42. The servo motor mechanism 43 of the first engaging position adjusting mechanism 44 is provided with a rotary encoder 45, which serves as a half nut position detecting mechanism. The half nut 41 is provided, at the outer wall 41c thereof, with a second engaging position adjusting mechanism 46 comprising a cylinder mechanism 27 which is an abutting moving mechanism and has two cylinders. Both the mechanisms 44 and 46 are coupled through a moving plate 47. At the time of die thickness adjustment, based on the detected values of the movable platen position detecting mechanism and the half nut position detecting mechanism, the half nut 41 is moved to a position capable of engaging with the engaging part 39 of the tie bar 37, by the first engaging position adjusting mechanism 44. At the time of molding, the half nut 41 is moved to a position capable of engaging with the engaging part 39 of the tie bar 37 when the dies are closed, by the second engaging position adjusting mechanism 46.

Figure 10:
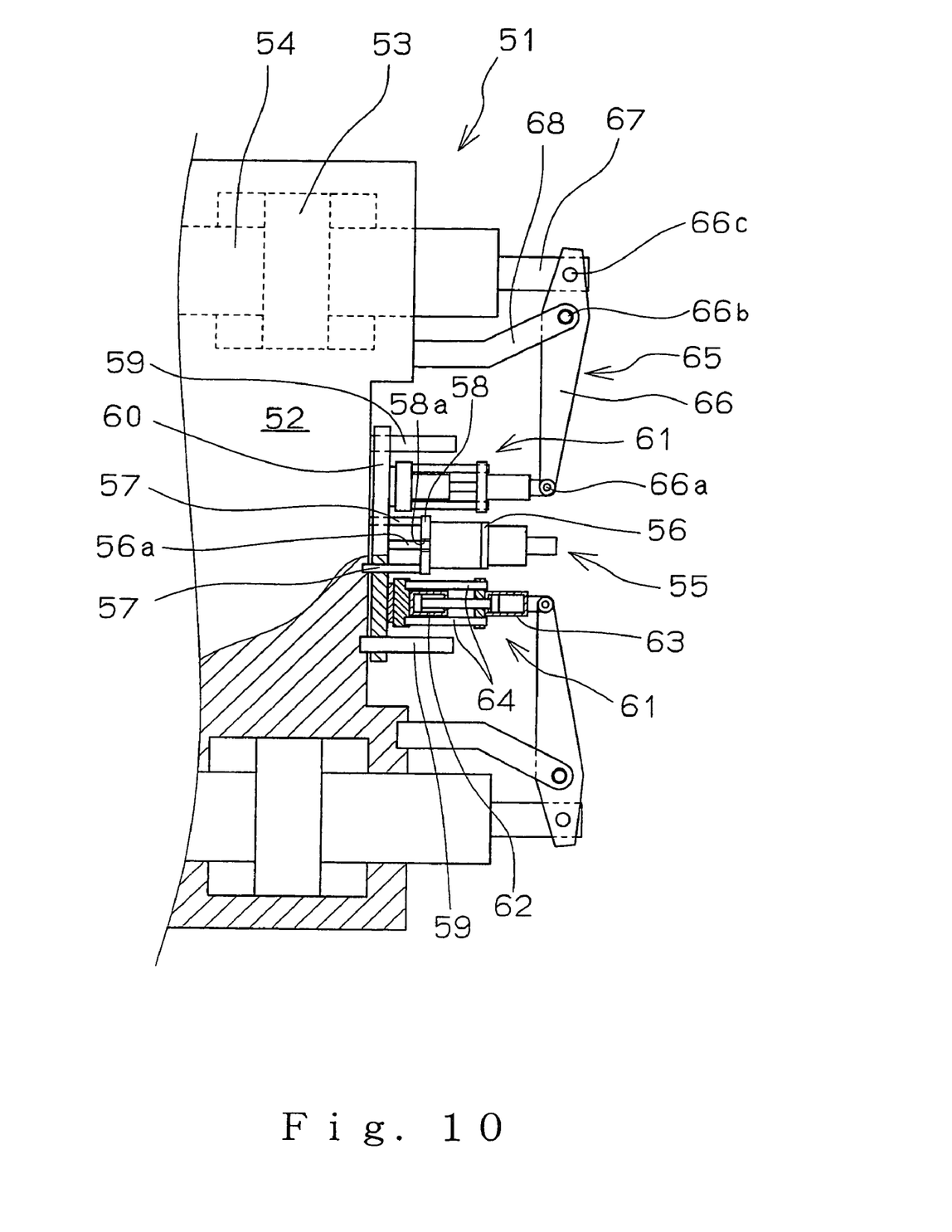
FIG. 10 is a plan view showing an example 2 of a die clamping apparatus.

In the present invention, the first engaging position adjusting mechanism and the second engaging position adjusting mechanism can be connected to the rod of the die clamping cylinder through a link mechanism having a boosting mechanism. In a die clamping apparatus 51 of an example 2 shown in FIG. 10, the structure of a stationary platen 52, a die clamping cylinder 53, a tie bar 54, a die opening/closing cylinder (not shown), a half nut, etc., is the same as that of the die clamping apparatus 1 shown in FIG. 1. In the example 2 of FIG. 10, a servo motor mechanism 56 of a first engaging position adjusting mechanism 55 is fixed to the stationary platen 52. The first engaging position adjusting mechanism 55 will be explained concretely. Four rods 57 having a predetermined length are secured to the stationary platen 52 to be projected from the injecting device side surface thereof and between the die clamping cylinders 53. A plate 58 having a center hole 58a is fixed at the ends of the rods 57. A body of a servo motor mechanism 56 is connected to the injecting device side surface of the plate 58. A driving rod 56a of the servo motor mechanism 56 extends through the hole 58a of the plate 58 toward the stationary platen 52. Four guide rods 59 are fixed to the stationary platen 52 to be projected from the injecting device side surface thereof and outside the above-mentioned four rods 57. A moving plate 60 is movably attached to the guide rods 59. The driving rod 56a of the servo motor mechanism 56 is fixed to the moving plate 60. Thus, the moving plate 60 can be moved by the servo motor mechanism 56.

Two second engaging position adjusting mechanisms 61 are attached to the moving plate 60. The second engaging position adjusting mechanism 61 will be explained in concrete. Cylinder portions of two first cylinders 62 are fixed to the moving plate 60. A rod of the first cylinder 62 is directly connected to a rod of a second cylinder 63. The movement of the second cylinder 63 is guided by a guide rod 64. A cylinder portion of the second cylinder 63 is axially attached to one end 65a of a link member 66 in a link mechanism 65. A shaft support rod 68 having a predetermined length is fixed to the stationary platen 52 on the injecting device side surface and between each rod 67 projecting from the die clamping cylinder 53 to the injecting device side and each of the second engaging position adjusting mechanism 61. The link member 66 is axially attached at its fulcrum 66b by the shaft support rod 68. The other end 66c of the link member 66 is axially attached by the rod 67 of the die clamping cylinder 53. Accordingly, in the example 2, the first engaging position adjusting mechanism 55 and the second engaging position adjusting mechanism 61 are connected to the die clamping cylinder 53 through the link member 66 of the link mechanism 65. The ratio of the distance between the fulcrum 66b of the link member 66 and the end 66c axially attached by the rod 67 of the die clamping cylinder 53 to the distance between the fulcrum 66b and the end 66a axially attached by the second cylinder 63 is 1:4. Accordingly, the link mechanism 65 of the example 2 has a boosting mechanism when the force of the first engaging position adjusting mechanism 55 is transmitted to the rod 67 of the die clamping cylinder 53. In the example 2, thanks to the link mechanism 65, although a comparatively small and cheap servo motor mechanism 56 is used for the first engaging position adjusting mechanism 55, two die clamping cylinders 53 and the tie bars 54 can be moved at the time of die thickness adjustment. It can be constituted that the second engaging position adjusting mechanism is attached to the stationary platen 52, the first engaging position adjusting mechanism is attached to the moving plate fixed to the second engaging position adjusting mechanism, and the link mechanism having a boosting mechanism is provided between the first engaging position adjusting mechanism and the rod of the die clamping cylinder. At the time of die thickness adjustment and at the time of molding, the first engaging position adjusting mechanism 55 and the second engaging position adjusting mechanism 61 of the die clamping apparatus 51 of the example 2 shown in FIG. 10 operate same as the embodiment shown in FIG. 1, respectively.

The die clamping apparatus of the present invention is not limited to the embodiments, the example 1 and the example 2, but can be modified as follows.

(1) a die clamping apparatus wherein a die clamping cylinder is provided on a stationary platen, a half nut is provided on a movable platen, a tie bar which is a piston rod of a die clamping cylinder is removably inserted in the movable platen, and a support plate is not provided;

(2) a die clamping apparatus wherein a die clamping cylinder is provided on a movable platen, a half nut is provided on a stationary platen, a tie bar which is a piston rod of a die clamping cylinder is removably inserted in the stationary platen;

(3) a die clamping apparatus wherein a central shaft of a tie bar extends from a stationary platen to a movable platen, a die clamping cylinder is provided on one of the stationary platen and the movable platen, a piston rod of the die clamping cylinder is slidably inserted over the outer periphery of the central shaft, the tie bar is composed of the central shaft and the piston rod, and a half nut is provided on the other plate;

(4) a vertical die clamping apparatus wherein a stationary platen and a movable platen are provided in a vertical direction, and die clamping is carried out by a die clamping cylinder after engaging a half nut with an engaging part of a tie bar;

(5) a die clamping apparatus for injection compression molding and an injection press molding wherein a half nut is engaged with an engaging part of a tie bar, and after a molten resin is injected and filled in a cavity, a die clamping cylinder is operated to move a movable platen toward a stationary platen. In such an injection press, etc., a half nut engaging position is often set slightly before the die closing completion position.

Needless to say, the present invention is not limited to the above-mentioned embodiments, but can be modified by a person having ordinary skill in the art without departing from the spirit of the invention.

What is claimed is:

1. A die clamping apparatus including;
    a die opening/closing mechanism for moving a movable platen having a movable die close to or away from a stationary platen having a stationary die,
    a die clamping cylinder for clamping the stationary die and the movable die,
    a tie bar having an engaging part formed on the periphery thereof and pulled by the die clamping cylinder, and
    a half nut capable of disengageably engaging with the engaging part,
    wherein the die clamping apparatus comprises a first engaging position adjusting mechanism for controlling a movement of the tie bar or the half nut to a half nut engaging position at the time of die thickness adjustment, and
    a second engaging position adjusting mechanism which allows the tie bar or the half nut to move in a die clamping or die opening direction and moves the tie bar or the half nut to the half nut engaging position at the time of molding.

2. A die clamping apparatus including;
    a die opening/closing mechanism for moving a movable platen having a movable die close to or away from a stationary platen having a stationary die,
    a die clamping cylinder for clamping the stationary die and the movable die,
    a tie bar having an engaging part formed on the periphery thereof and pulled by the die clamping cylinder, and
    a half nut capable of disengageably engaging with the engaging part,
    wherein the die clamping apparatus comprises a first engaging position adjusting mechanism for controlling a movement of the tie bar or the half nut, based on a detected value of one of a tie bar position detecting mechanism and a half nut position detecting mechanism and a detected value of a movable platen position detecting mechanism, and
    a second engaging position adjusting mechanism for moving the tie bar or the half nut to a half nut engaging position by an abutting moving mechanism.

3. A die clamping apparatus according to claim 1, wherein the first engaging position adjusting mechanism is comprised of a moving mechanism using an electric motor for performing feedback-control, and the second engaging position adjusting mechanism is comprised of a moving mechanism having two cylinders provided in series for moving the tie bar or the half nut by a predetermined distance.

4. A die clamping apparatus according to claim 1, wherein the tie bar is formed by an extension of a piston rod of the die clamping cylinder, the die clamping cylinder is controlled by a servo valve and is provided with an engaging position adjusting mechanism comprised of the first engaging position adjusting mechanism and the second engaging position adjusting mechanism.

5. A die clamping apparatus according to claim 1, wherein the first engaging position adjusting mechanism or the second engaging position adjusting mechanism is connected to a rod of the die clamping cylinder through a link mechanism having a boosting mechanism.

6. A die clamping apparatus according to claim 2, wherein the first engaging position adjusting mechanism is comprised of a moving mechanism using an electric motor for performing feedback-control, and the second engaging position adjusting mechanism is comprised of a moving mechanism comprised of two cylinders provided in series for moving the tie bar or the half nut by a predetermined distance.

7. A die clamping apparatus according to claim 2, wherein the tie bar is formed by an extension of a piston rod of the die clamping cylinder, the die clamping cylinder is controlled by a servo valve and is provided with an engaging position adjusting mechanism comprised of the first engaging position adjusting mechanism and the second engaging position adjusting mechanism.

8. A die clamping apparatus according to claim 2, wherein the first engaging position adjusting mechanism or the second engaging position adjusting mechanism is connected to a rod of the die clamping cylinder through a link mechanism having a boosting mechanism.

9. A die clamping method in which a movable platen is moved toward a stationary platen by a die opening/closing mechanism, and after a half nut is engaged with an engaging part formed on a tie bar, die clamping is carried out by a die clamping cylinder,
    wherein at the time of a die thickness adjustment, a first engaging position adjusting mechanism controls and moves the tie bar or the half nut to a changed half nut engaging position, and
    at the time of molding, the first engaging position adjusting mechanism is fixed and a second engaging position adjusting mechanism allows the tie bar to be moved in die clamping and strong die opening operations and moves the tie bar or the half nut to the half nut engaging position.

* * * * *